Aug. 19, 1952     W. M. WILLITTS     2,607,502
HAND TRUCK
Filed Dec. 6, 1950     3 Sheets-Sheet 1
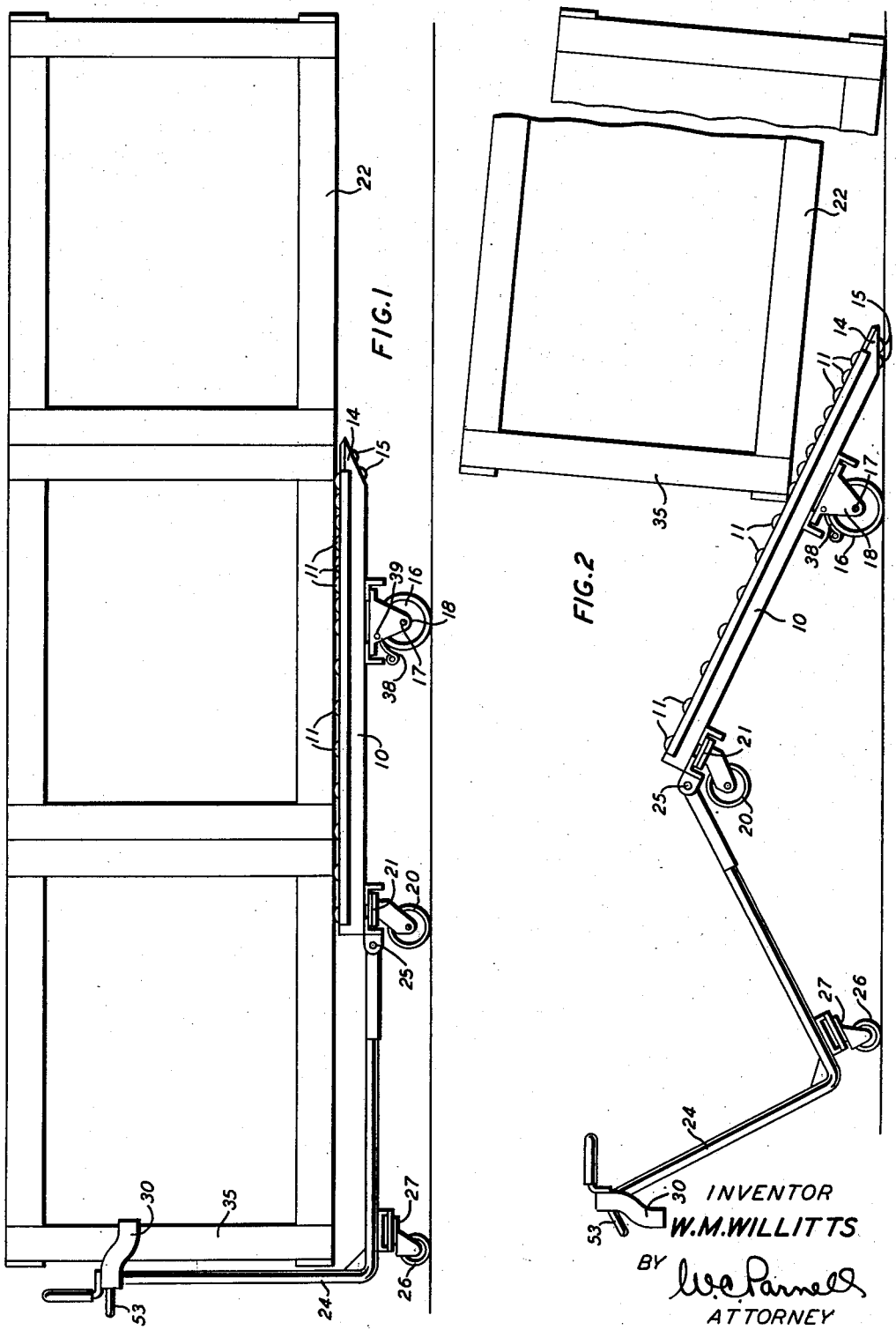
INVENTOR
W.M.WILLITTS
BY
W. C. Parnell
ATTORNEY Aug. 19, 1952  W. M. WILLITTS  2,607,502
HAND TRUCK
Filed Dec. 6, 1950  3 Sheets-Sheet 2
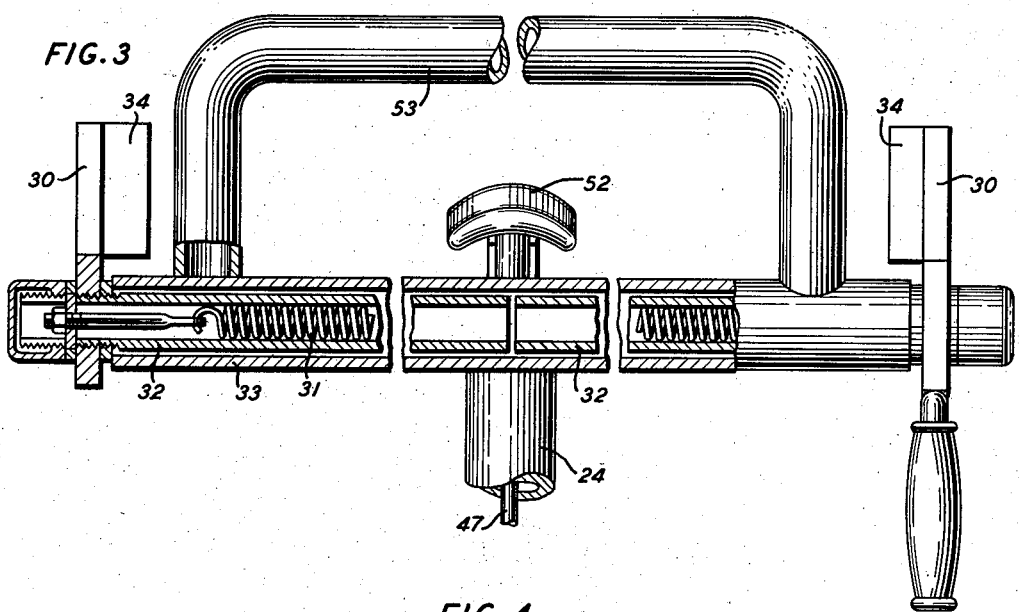
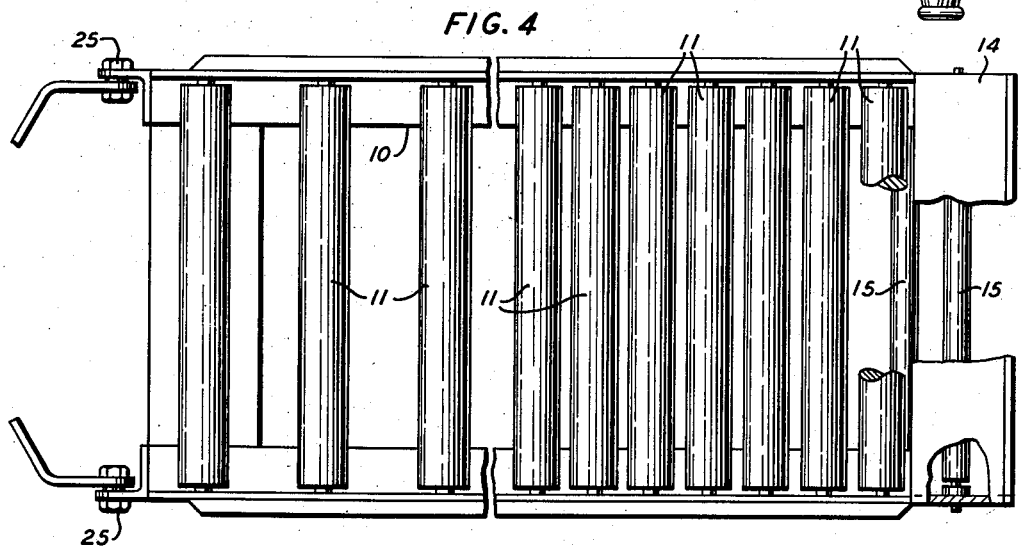
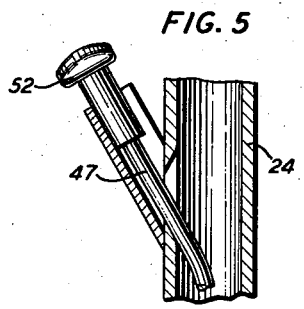
INVENTOR
W.M.WILLITTS
BY W.C.Parnell
ATTORNEY Aug. 19, 1952 W. M. WILLITTS 2,607,502
HAND TRUCK
Filed Dec. 6, 1950 3 Sheets-Sheet 3

INVENTOR
W.M.WILLITTS
BY *W.E.Parnes*
ATTORNEY

Patented Aug. 19, 1952

2,607,502

UNITED STATES PATENT OFFICE 2,607,502

HAND TRUCK

William M. Willitts, Lawrence Harbor, N. J., assignor to Western Electric Company, Incorporated, New York, N. Y., a corporation of New York Application December 6, 1950, Serial No. 199,461

2 Claims. (Cl. 214—65.4)

This invention relates to hand trucks and more particularly to hand trucks for transporting large and heavy articles and depositing them at desired locations.

The commercially known hand trucks usually have relatively short straight handles, by the aid of which they may be propelled, connected to the supporting unit of the truck, making it impossible or exceedingly difficult for the truck to support articles of considerable length. Furthermore, it would be difficult to transport such articles on trucks of the standard structure or unload the articles therefrom.

An object of this invention is to provide a hand truck which is simple in structure yet highly efficient in transporting and depositing articles which are considerably longer than the supporting unit of the truck.

With this and other objects in view, the hand truck includes a load supporting frame mounted for transportation upon a series of wheels, one of which may be pivoted, and an angular handle connected to the frame and having a portion of considerable length in alignment with the frame when in its supporting position so that an article supported by the frame may extend over this portion of the handle. More specifically, the frame includes a series of rollers upon which the article rests to facilitate in the loading of an article on the truck and the depositing of the article at a given position. Furthermore, the handle carries clamps for clamping the article against displacement while in transportation and a convenient handle to actuate a brake operating a mechanism to apply a braking force to the main supporting wheels of the load supporting frame while the frame is tilted in unloading the article.

Other objects and advantages will be apparent from the following detailed description when considered in conjunction with the accompanying drawings wherein:

Fig. 1 is a side elevational view of the hand truck with an article loaded thereon;

Fig. 2 illustrates the position of the hand truck while unloading the article;

Fig. 3 is an enlarged fragmentary sectional view of a portion of the handle, illustrating the article gripping means together with the brake actuating handle;

Fig. 4 is a fragmentary top plan view of the supporting frame;

Fig. 5 is a vertical sectional view of the brake handle; and

Figure 6:
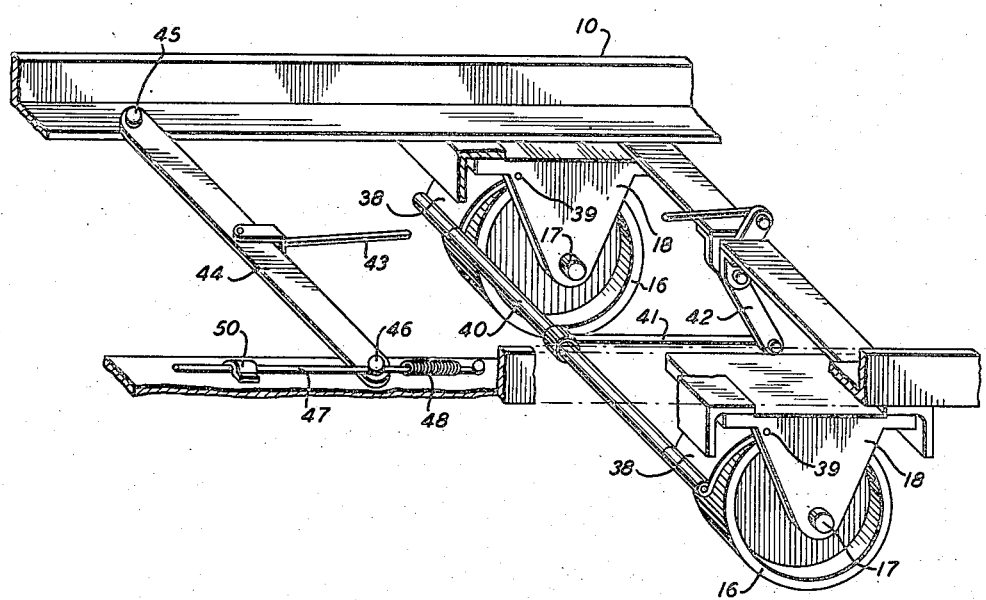
Fig. 6 illustrates the brake operating mechanism for the main wheels of the truck.

Referring now to the drawings, the truck includes a main frame 10 which is an open structure supporting a series of rollers 11, those near the rear of the frame being disposed closely adjacent each other as illustrated in Figs. 2 and 4, while those at the forward half of the frame are disposed farther apart. The purpose in the spacing of the rollers in this manner is essential in providing the desired support for the trailing end of the article during unloading of the article as illustrated in Fig. 2. The rearmost end 14 of the frame is angular and supports a pair of rollers 15 which assist in guiding the truck beneath an article while being loaded or during the unloading operation.

The frame 10 with its rollers 11 and 15 is supported mainly by a pair of wheels 16 mounted on aligned shafts 17 in their supporting brackets 18, the brackets being fixed to the underside of the frame. Another wheel 20 of the swinging type, pivoted at 21 to the forward part of the frame, permits easy turning of the hand truck while transporting an article 22, such as a large crate, from one position to another.

An L-shaped hollow handle 24 has its horizontal portion (Fig. 1) pivotally connected at 25 to the forward portion of the frame 10 and supported by a wheel 26 of the pivoted type connected at 27 near the bend in the handle. The vertical portion of the handle carries clamps 30 normally urged inwardly toward each other by a spring 31 extending through tubes 32 which support the clamps 30 as shown in Fig. 3. A larger tube 33 is mounted at right angles at the upper end of the L-shaped handle 24 and serves as a housing for the tubes 32 and the spring 31. The clamps 30 may be moved outwardly by their individual handles 33, their tubes 32 sliding in the main or larger tube 33 against the force of the spring 31, until the associated clamps engage the forward portion of the crate or article 22 as illustrated in Fig. 1. When in this position, the inwardly extending portions 34 of the clamps will extend around adjacent boards 35 of the crate, locking it on the hand truck with equal force from the single spring whether or not the crate is centrally positioned on the truck.

The brake mechanism includes brake shoes 38 (Fig. 6) having their upper ends positioned between the legs of the brackets supporting their respective wheels 16 and pivoted at 39. The lower ends of the brake shoes are connected to a rod 40, the central portion of which is connected through a link 41 to the lower end of a bell crank lever 42. The bell crank lever is pivotally supported by the frame and has its upper end or leg connected by a rod 43 to the central portion of a lever 44. One end of the lever 44 is pivoted at 45 to one side of the frame, while the other end of the lever is connected at 46 to a pull rod 47. A spring 48 connected to the lever 44 normally urges the brake operating mechanism into the position shown where the brake shoes will be free of the wheels 16. The rod 47 in the present embodiment of the invention is more in the form of a wire, guided longitudinally of the frame by elements 50 and extending through the hollow L-shaped handle to the handle or gripping member 52 which may be pulled by the operator when it is desirable to apply the brakes to the wheels 16. Furthermore, a U-shaped gripping member 53 has its ends connected to the horizontal tubular member 31 for gripping by the operator in propelling the hand truck.

Considering now the function of the hand truck, it will be apparent that the truck, although in the position shown in Fig. 1 when loaded or unloaded, may be readily tilted to move it beneath an article as illustrated in Fig. 2. When in this position, the forward wheel 20 of the frame is raised from the floor and the wheel 26 of the handle assists in the lifting of the truck into the angular position shown. While tilted, the rollers 15 function in preventing the frame from digging into the floor and assists in moving the frame beneath the article. Furthermore, the rollers 11 permit easy movement of the heavy and large article forwardly from the position shown in Fig. 2 to that shown in Fig. 1. When the crate or article is in the loaded position, it will be noted that a considerable portion of the article extends forwardly beyond the front edge of the truck, but this does not interfere with the position of the handle 24 nor inconveniences the operator while pulling the truck, through the aid of the handle. The article is clamped in position through the actuation of the clamps 30 and held against displacement by the inwardly projecting portions 34 through the assistance of the spring 31. The operator may now grip the portion 53 of the handle and move the truck with its crate or article to any desired location. When the operator arrives at the desired location with the article, the clamps 30 may be disengaged after which the operator may apply the brakes 38 to the wheels 16 while at the same time force the crate or article rearwardly over the rollers 11. The application of braking forces to the main supporting wheel 16 makes it possible for the operator to readily move the crate rearwardly on the truck without causing movement of the truck in the same direction. Furthermore, it is important to have a braking force on the wheels 16 during the latter portion of the unloading operation to prevent the crate from forcing the hand truck to the left (Fig. 2) and possibly injuring the operator. As the crate or article is moved to the right (Fig. 1) and its center of gravity is shifted beyond the main supporting wheels 16, the leading end of the crate will cause it to tilt about the axes of the supporting wheels 16 into the position shown in Fig. 2, after which the crate will slide on the floor into its desired position while the trailing end of the crate rides down the rollers 11. At this point the purpose of positioning certain of the rollers 11 closely adjacent each other becomes apparent, permitting relatively easy movement of the crate into its desired position on the floor. If desired, the operator may control the braking force on the wheels 16 to allow the truck to move forwardly or to the left (Fig. 2) during the unloading operation, allowing the crate to slowly come to rest on the floor as the truck is moved from beneath it.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A hand truck comprising a load supporting frame having a single pivoted front wheel, main supporting wheels for the frame on a fixed axis disposed intermediate the front and rear ends of the frame and about which the frame may be tilted to load and unload the truck, an L-shaped handle pivotally mounted at the front end of the frame and extending forwardly below the top of the frame to permit overhanging of a load on the frame, a wheel for supporting the handle and providing a fulcrum for tilting the frame about the fixed axis, brakes for the main supporting wheels, a brake actuator supported by the handle, and a mechanism operatively connecting the brake actuator and the brakes to normally hold the brakes unoperated and actuable by the actuator to cause the brakes to retard motion of the wheels or hold them against movement.

2. A hand truck comprising a load supporting frame having a single pivoted front wheel, main supporting wheels for the frame on a fixed axis disposed intermediate the front and rear ends of the frame and about which the frame may be tilted to load and unload the truck, load supporting rollers carried by the frame and disposed in parallel spaced positions laterally of the frame, an L-shaped handle pivotally mounted at the front end of the frame and extending forwardly below the top of the frame to permit overhanging of a load on the frame, and a wheel for supporting the handle and providing a fulcrum for tilting the frame about the fixed axis.

WILLIAM M. WILLITTS.

REFERENCES CITED

The following references are of record in the file of this patent:

UNITED STATES PATENTS

| Number | Name | Date |
|---|---|---|
| 468,559 | Chatfield | Feb. 9, 1892 |
| 575,390 | Burnett | Jan. 19, 1897 |
| 637,650 | Northrop | Nov. 21, 1899 |
| 2,418,522 | Needham | Apr. 8, 1947 |
| 2,444,690 | Almendinger et al. | July 6, 1948 |
| 2,506,471 | Siegal | May 2, 1950 |
| 2,556,532 | Goldman | June 12, 1951 |
| 2,557,183 | Gelles | June 19, 1951 |

FOREIGN PATENTS

| Number | Country | Date |
|---|---|---|
| 325,245 | Italy | Mar. 6, 1935 |